United States Patent
Venkatesh et al.

(10) Patent No.: US 7,555,506 B2
(45) Date of Patent: Jun. 30, 2009

(54) PARTIAL DESERIALIZATION OF COMPLEX TYPE OBJECTS

(75) Inventors: Ramachandran Venkatesh, Bellevue, WA (US); Denis Y Altudov, Redmond, WA (US); Beysim Sezgin, Redmond, WA (US); Jose A Blakeley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/099,020

(22) Filed: Apr. 5, 2005

(65) Prior Publication Data

US 2006/0225027 A1  Oct. 5, 2006

(51) Int. Cl.
*G06F 17/30* (2006.01)
(52) U.S. Cl. .................. 707/206; 707/103 R; 707/205; 707/2
(58) Field of Classification Search .................. None
See application file for complete search history.

(56) References Cited

U.S. PATENT DOCUMENTS

| | | | |
|---|---|---|---|
| 5,911,776 A * | 6/1999 | Guck | 709/217 |
| 2004/0123048 A1 * | 6/2004 | Mullins et al. | 711/141 |
| 2005/0091228 A1 | 4/2005 | Venkatesh | |
| 2005/0108627 A1 * | 5/2005 | Mireku | 715/513 |

OTHER PUBLICATIONS

U.S. Appl. No. 10/775,282, filed Feb. 10, 2004, Ramachandran Venkatesh.
U.S. Appl. No. 10/775,982, filed Feb. 10, 2004, Jose A. Blakeley.

* cited by examiner

*Primary Examiner*—Cam Y T Truong
(74) *Attorney, Agent, or Firm*—Workman Nydegger (57) ABSTRACT

Systems and methodologies of partially deserializing a Complex Type Object, via a deserializer that intercepts and materializes such object on demand. The object or a subset thereof can be deserialized to produce an Instance of Complex Type that is implemented by a property store. The deserializer can include an analyzer component that analyzes the Property Store.

9 Claims, 9 Drawing Sheets

PARTIAL DESERIALIZATION OF COMPLEX TYPE OBJECTS

TECHNICAL FIELD

The subject invention relates generally to deserialization of objects, and in particular to partial deserialization of Complex Type Objects.

BACKGROUND OF THE INVENTION

Increasing advances in computer technology (e.g., microprocessor speed, memory capacity, data transfer bandwidth, software functionality, and the like) have generally contributed to enhanced computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. A common approach is to store electronic data in one or more databases. Today, a Data Base Management System (DBMS) can typically manage any form of data including text, images, sound and video.

In general, a typical database can be referred to as an organized collection of information with data structured such that a computer program can quickly search and select desired pieces of data, for example. Commonly, data within a database is organized via one or more tables. Such tables are arranged as a set of rows (or records). Each row consists of a set of columns (or fields). Records are commonly indexed as rows within a table and the record fields are typically indexed as columns, such that a row/column pair of indices can reference a particular datum within a table. For example, a row may store a complete data record relating to a sales transaction, a person, or a project. Likewise, columns of the table can define discrete portions of the rows that have the same general data format, wherein the columns can define fields of the records.

Queries for such tables can be constructed in accordance to a standard query language (e.g., structured query language (SQL)), to access content of a table in the database. Likewise, data can be input (e.g., imported) into the table via an external source.

A DBMS typically employs predefined (or built-in) simple scalar data types, which can refer to a category of variable that is determined by the kind of data stored in it. Typically "Simple Types", or "Scalar Types" refer to simplest forms of data manipulated by programming/execution environment, including but not limited to Boolean, integer, float, date, time, date & time, GUID, text string, binary array and the like. For example, integer, floating point, string, decimal, date and binary are common simple data types. Recently, efforts have been directed to the definition of more complex data types that contain a richer internal structure such as a Point (containing 2 or 3 floating point coordinates), a Line (containing 2 points), or an Address (containing street, city, state, and zip properties). Such complex data types enable data management system developers or application developers to extend the type system capabilities of the data management system (e.g., DBMS). These complex data types are also commonly referred to as user-defined data types (UDTs) and they facilitate increasing the data management system's storage flexibility and management. More particularly, the functionality of a UDT affords DBMS implementers, and application developers the flexibility to create a UDT (e.g., via standard SQL statements), which are compatible with a particular database application.

In such settings, deserialization can act as a process of turning Serialized form of Complex Type Object (CTO—being a particular set of data that satisfies definition of Complex Type) into its original form, acceptable for usual manipulation within corresponding Execution Environment, such as an environment that facilitates execution of a computer program. Such Execution Environment can include Operating System, Database Management System, Operating System API, Virtual Machine, Compiler, JIT Compiler, Libraries, Memory Management, miscellaneous Runtime Support components and other components. Examples include Microsoft NET Framework, Java framework, native Windows execution environment, Microsoft SQL Server and the like.

Typically, deserialization can become costly for a variety of reasons. For example, memory resources for an entire object graph representing Complex Type Object have to be allocated, and also such graph has to be populated with the state of the object from the binary stream. Moreover, the larger a size of an object, then the higher is the cost of associated deserialization.

One major disadvantage of such approach is that amount of data processed by the system can become disproportionably large when compared to the amount of data that is requested therefrom—for example, if a Person object contains a plurality of Properties associated therewith, and only the name of that person is requested, then all associated fields would be processed merely for the purpose of obtaining the value of one. As such, manipulating Complex Type Object can become a costly process, when persisting or transmission of the Object is involved.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of deserializing a Complex Type Object (CTO—a particular set of data that satisfies definition of Complex Type) via a deserializer that can intercept request for deserialization and produce an instance of Complex Type (CT—definition of object that is logically comprised of one or more Simple Type or Complex Type Properties) that is implemented by a Property Store. The deserializer can include an analyzer component that analyzes the Property Store, to typically deserialize only pieces of the object that is so required by a particular operation—instead of deserializing the entire object. It is to be appreciated that individual properties may or may not be designated by Complex Type Author, or Execution Environment, or Deserializer, or other Person or System as having its state contained by Property Store—rather than other Complex Type Object (CTO) Implementation. Data necessary to evaluate such Property may then be extracted from Property Store independently of or in conjunction with other data stored within Property Store.

Such arrangement can optimize database procedures, by mitigating a requirement of updating all indexes associated with the object during an update and/or read operation for example, and can further facilitate employing an associated log record as a difference (delta log) to track modifications of the various pieces of the object. The Property Store can be allocated from a variety of storage mediums, such as Heaps, and allocated memory can be subsequently reused.

In a related aspect, the subject invention can facilitate tracking a change modification entry for an encapsulated object. For example during an update operation, the dirty object, as well as the pre-image and post-image for the encapsulated object, can be saved, whereby the changes for the dirty object can be applied in one stage. Such operation can be performed eagerly or lazily, wherein an associated string can be converted to a Serialized Form immediately, or await the action update to perform serialization. Moreover, a requirement to hold on to the Complex Type objects can be mitigated, and typically property stores can be maintained. By employing Property Store, space can be deterministically allocated and reclaimed, via a variety of algorithms such as least-recently used (LRU) or a most recently used (MRU) priority technique, to provide an efficient partial deserialization of the encapsulated object.

According to a further aspect of the subject invention, a state associated with the object can be encapsulated as part of a Property Store, wherein the Property Store can function as an internal object, and provide a control over an associated lifetime or provide for a potential re-use of the object. Additionally, once delta stream of changes related to various pieces of the object have been created, an optimized index maintenance plan can be employed in the context of a System, such as DBMS to change only the required indexes, and not modify the remaining indexes. The Property Store can be managed by a property store manager, which acts between an object and its state. The property store can be implemented for at least one of a top level object, a reference implementation (wherein an outer property store can be employed for navigation,) and a client side backed by memory. Such implementations can be chained together to enable navigation among various paths and track the update, to determine if a copy of the object should be made, for example.

In yet a further aspect of the subject invention, a particular component labeled "encapsulation component" can examine the object and knowing in advance typical usage scenario of a given Complex Type, can then selectively designate certain Properties of the object to have their state maintained by a Property Store. Additionally, various artificial intelligence components can be employed to facilitate such encapsulation. Moreover, in case of collection types (e.g., a person and list of related addresses), loops can be analyzed to determine which members should be accessed and in what order.

The subject invention can be implemented in a data management system such as a relational DBMS, an object-relational DBMS, or a file system in conjunction with actual and/or embedded references or in any other Execution Environment. For example, a customer table relationship and an order table relationship can represent an actual reference that is independently navigable in both directions. Alternatively or in conjunction, a person can have a set of addresses and the relationship between the person and the address can represent an embedded reference, which is not directly navigable except thru the person.

The subject invention can supply a user with in memory independence, and an author of a type typically need not have actual knowledge of how data is presented. Moreover, distribution of various data types in a particular column in the context of DBMS can be determined, via an optimization component in the Database layer, to determine a caching strategy for the various tables, for example.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components can communicate via local and/or remote processes such as in accordance with a signal having one or more data packets (e.g., data from one component interacting with another component in a local system, distributed system, and/or across a network such as the Internet with other systems via the signal).

Definitions

The following provides definitions for various terms as used herein.

"Persistent Storage"—any device that may contain data, except for RAM (Random Access Memory).

"Execution Environment"—an environment that facilitates execution of a computer program. Such can comprise of some or all of: Operating System, Database Management System, Operating System API, Virtual Machine, Compiler, JIT Compiler, Libraries, Memory Management, miscellaneous Runtime Support components and other components. Examples include Microsoft NET Framework, Java framework, native Windows execution environment, Microsoft SQL Server and the like.

"Simple Types", or "Scalar Types"—traditionally and widely used term that refers to simplest forms of data manipulated by programming/execution environment, including but not limited to Boolean, integer, float, date, time, date & time, GUID, text string, binary array and the like.

"Simple Type Value" (STV)—Particular instance of Simple Type, for example 123 is a Value of Simple Type "integer".

"Simple Type Instance"—same as STV.

"Complex Type" (CT)—definition of object that is logically comprised of one or more Simple Type or Complex Type Properties.

"Complex Type Object" (CTO)—particular set of data that satisfies definition of Complex Type.

"Complex Type Instance"—same as CTO.

"Complex Type Value"—same as CTO.

"Value"—either a Simple Type Value or a Complex Type Value (CTO).

"Property"—element of CT interface, means to access logical component of complex type. Given a CTO, Property can be evaluated to a Value.

"Field"—instance of data, comprising implementation of Complex Type. Set of fields comprises internal implementation of Complex Type and may or may not match set of CT Properties.

"Complex Type Implementation"—In general anything than can hold state of the CTO sufficient to store and retrieve Property Values. Traditional, trivial Implementation consists of Set of Fields, one Field for each Property.

"Serialized Form of CTO"—a set of data that is sufficient to restore state of a CTO and is suitably shaped to be stored or transmitted over network and network-like facilities.

"Serialization"—process of producing Serialized Form from a CTO.

"Deserialization"—process of turning Serialized form of CTO into its original form, acceptable for usual manipulation within corresponding Execution Environment.

Figure 1:
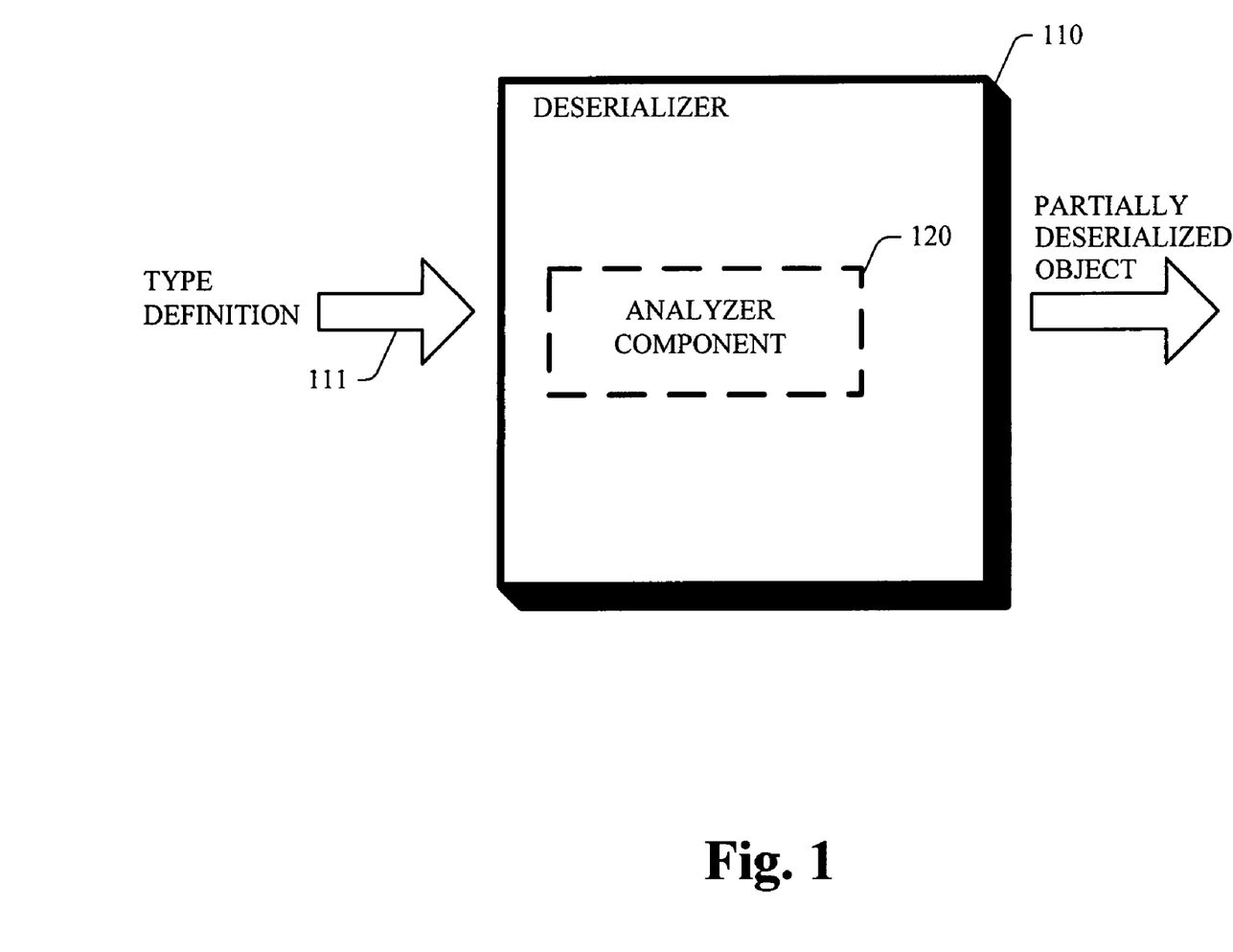
FIG. 1 illustrates a block diagram of a partial deserializer in accordance with an aspect of the subject invention.

The subject invention provides for systems and methods of deserializing a Complex Type Object via a deserializer 110, implemented in a framework for partial deserialization, wherein a state can be stored in an encapsulated Property Store. As illustrated, a type definition component 111 can include encapsulated objects that can be partially deserialized as required by a particular operation, instead of deserializing the entire object. As part of the type definition component 111, such encapsulated object can declaratively be indicated by the author as a Property backed by Property Store, rather than fields defining the object. Typically, User Defined Types (UDTs) facilitate database extensibility mechanism, and enable the modeling and manipulation of complex types within a storage environment; via concepts such as inheritance, containment, and multi-valued embeddings, for example. Commonly, in a user-defined type (UDT) storage format values can be self-describing, including the runtime type of the value. Additionally, sites of the declared type, including columns, embedded fields, and collection members, can contain values of the declared type or any of its sub types. Such values can be arbitrarily large (e.g., up to 2 GB), and contain arbitrarily large varying sized fields. Moreover, a specific sequence in which fields are persisted for each UDT value can exist. Furthermore, the domain of primitive values can be independently checkable.

It is to be appreciated that a Complex Type Object (CTO) value can be stored in any desired format. As explained earlier, in one aspect, the format can include self-describing values (e.g., XML). For example, every value in the CTO, including the run-time value, can be self-describing. Additionally, sites of the declared type can contain values of the declared type or any of the declared type sub-types. These sites of the declared type can include columns in a table within a DBMS, embedded fields and collection members. In general, a value can be converted from the serialized representation to an actual instance, and deserialized in scenarios such as when: a method has to be invoked on a CTO; it has to be passed to a function or procedure within an Execution Environment as an argument; or be returned from it.

The deserializer 110 can intercept and materialize on demand the encapsulated object as part of the type definition component 111, to perform partial de-serialization thereof. Such deserializer 110 can include an analyzer component 120 that can analyze the encapsulated object, such that only pieces of the object are deserialized as required by a particular operation—instead of deserializing the entire object. The framework for partial deserialization of the subject invention is typically built around two concepts, namely: (a) an abstracted property store, and (b) the use of system specified observer and mutator functions to manipulate the contents of the property store.

For example, in case of a UDT with the following definition:

```
class Person
\{
    String FirstName;
    String LastName;
    ByteArray Picture;
    ByteArray Resume;
    Int Age;
    public string FullName( )
    {
        return this.FirstName + this.LastName;
    }
}
``` such example can be rewritten with an explicit property store in the following way:

```
class Person
{
    private PropertyStore m__propStore;
    String FirstName
    {
        get
```

```
            {
                    return m_propStore.GetString("FirstName");
            }
            set
            {
                    m_propStore.SetString("FirstName", value);
            }
    }
    //... same for all properties
    public string FullName( )
    {
            return this.FirstName + this.LastName;
    }
    void Initialize(PropertyStore value)
    {
            this.m_propStore = value;
    }
}
```

By employing such pattern, "person" instances, typically become containers for user behaviors only, and all the states encapsulated by the person can actually be stored in the property store. Such process is composable and enables a server to re-use person instances readily without concerns regarding initialization issues. Moreover, if a person has an address that is also a composite type, such framework can permit the sharing of property stores in a safe manner. Also, since all reads and updates typically go through the property store interface, it acts as a "read and write barrier", and can be used to implement update optimizations such as partial update. Within DBMS for example, that have traditionally been available only from within the Transactional Structured Query Language (TSQL) environment.

It is to be appreciated that the above fully explicit code pattern is exemplary and other codes can also be employed. Moreover, by hiding various portions of the above code the following can be obtained:

```
class Person
{
    [SystemProperty]
    String FirstName
    {
            [MethodImplAttribute(MethodImplOptions.InternalCall)]
            get;
            [MethodImplAttribute(MethodImplOptions.InternalCall)]
            set;
    }
    //... same for all properties
    public string FullName( )
    {
        i. return this.FirstName + this.LastName;
    }
    void Initialize(PropertyStore value)
    {
            this.m_propStore = value;
    }
}
```

When the assembly is registered in the server (or even later, at invocation time), the method bodies for FirstName and LastName are generated to include the calls to the property manager, for example:

```
.method public hidebysig specialname instance string
get_FirstName( ) cil managed internalcall
{
} // end of method Person::get_FirstName
.method public hidebysig specialname instance void
set_FirstName(string 'value') cil managed internalcall
{
} // end of method Person::set_FirstName
The following IL for this class
.property instance string FirstName( )
{
.custom instance void [Framework]Framework.
SqlPropertyAttribute::.ctor( ) = ( 01 00 00 00 )
.get instance string Person::get_FirstName( )
.set instance void Person::set_FirstName(string)
} // end of property Person::FirstName
can be rewritten to:
// Code size 23 (0x17)
.maxstack 2
.locals init (class Test V_0)
IL_0000: ldarg.0
IL_0001: callvirt instance
class [Framework]Framework.ISqlPropertyManager
_TYPENAME_::_SqlGetPropertyManager( )
IL_0006: ldc.i4.s _ORDINAL_
IL_0008: callvirt instance
object [Framework]Framework.ISqlPropertyManager::GetValue(int32)
IL_000d: castclass _PROPTYPE_
IL_0012: stloc.0
IL_0013: br.s IL_0015
IL_0015: ldloc.0
IL_0016: ret
And
    // Code size 15 (0xf)
    .maxstack 3
    IL_0000: ldarg.0
    IL_0001: callvirt instance
class [Framework]Framework.ISqlPropertyManager
    _TYPENAME_::_SqlGetPropertyManager( )
    IL_0006: ldc.i4.s _ORDINAL_
    IL_0008: ldarg.1
    IL_0009: callvirt instance
    void [Framework]Framework.ISqlPropertyManager::SetValue(int32,
            object)
    IL_000e: ret
```

Similarly, for nested complex objects wherein the nested object has reference semantics, the subject invention can employ chaining property managers to extend the framework in a composable manner. Likewise, in cases wherein the nested object access has value semantics, producing a copy of the state of the property can be more efficient than object allocation and copy. An example of accessing embedded objects can include:

```
    public class Person
    {
        public Employee Manager
        {
            Get
            {
                return (Employee) m_propertyStore["manager"];
            }
        }
    }
```

Accordingly, a state can be encapsulated as part of a property store, wherein the property store can function as an internal object, and provide a control over an associated lifetime or provide for a potential re-use. It is to be appreciated that environments that implement the subject invention for data handling (e.g., storage, remoting, data access and the like) can include persistent storage (e.g., any device that can contain data, except for Random Access Memory), remoting across distributed applications, data access, programming/ execution environment (e.g., Operating System, Database Management System, Operating System API, Virtual Machine, Compiler, JIT Compiler, Libraries, Memory Management, miscellaneous Runtime Support components and other components) and the like.

Figure 2:
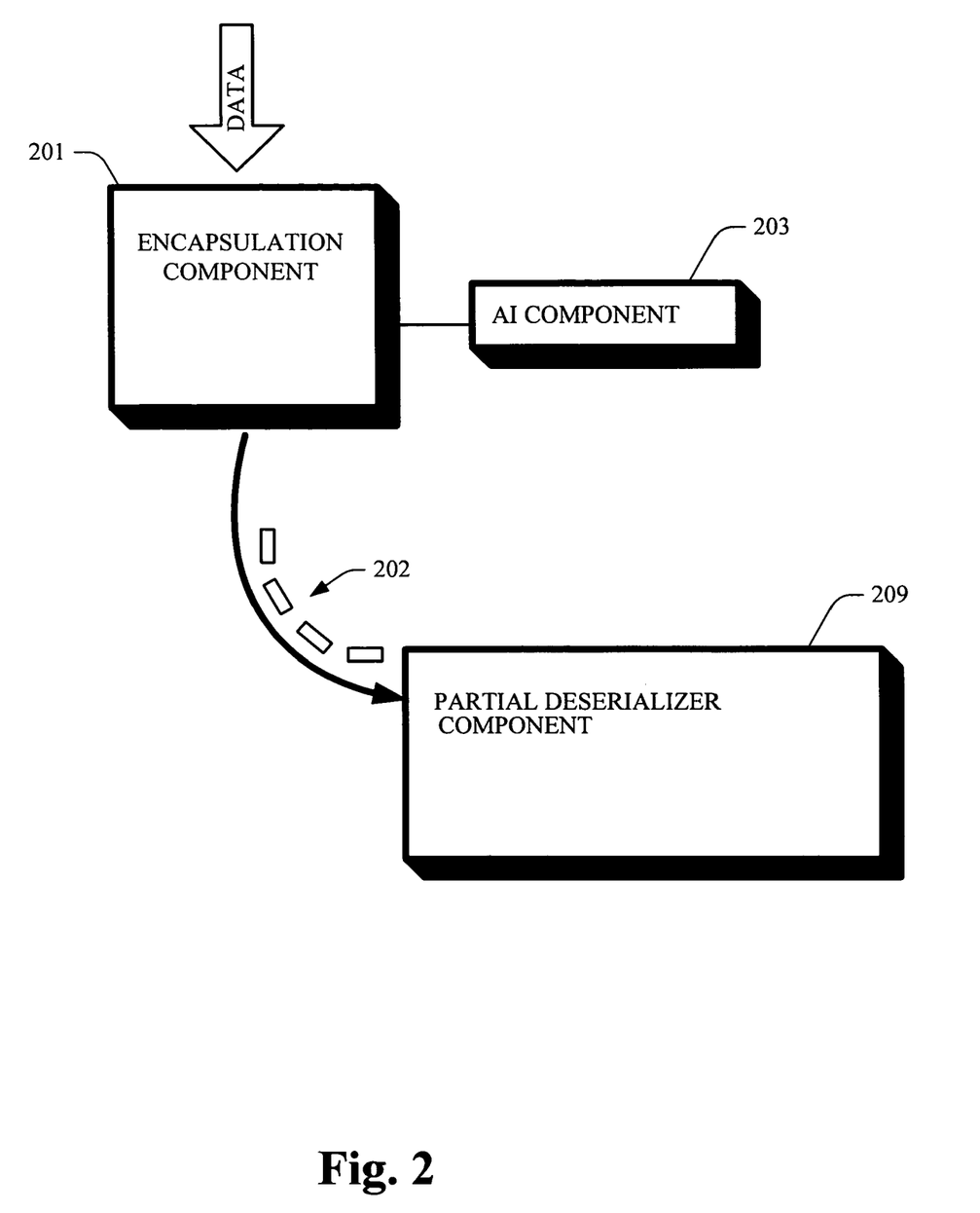
FIG. 2 illustrates a schematic diagram of an encapsulation component that can supply encapsulated objects for partial deserialization in accordance with an aspect of the invention.

FIG. 2 illustrates an encapsulation component 201 that can supply encapsulated objects 202 for a subsequent deserialization by the deserializer 209. In addition, the encapsulation component 201 can examine the objects and knowing in advance what needs to be done with such objects, (e.g., based on requirements of an operation) can then encapsulate certain portions of the object. Moreover, in case of collection types (e.g., persons and related addresses), loops can be analyzed to determine which members should be accessed and in what order.

Additionally, various artificial intelligence components can be employed to facilitate such encapsulation. For example, a process for learning explicitly or implicitly an efficient manner encapsulating can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). As shown in FIG. 2, the artificial intelligence (AI) component 203 can be employed to facilitate operation of the encapsulation component 201, to determine how to encapsulate an object, for example. The AI component 201 can employ any of a variety of suitable AI-based schemes as described supra in connection with facilitating various aspects of the herein described invention.

Figure 3:
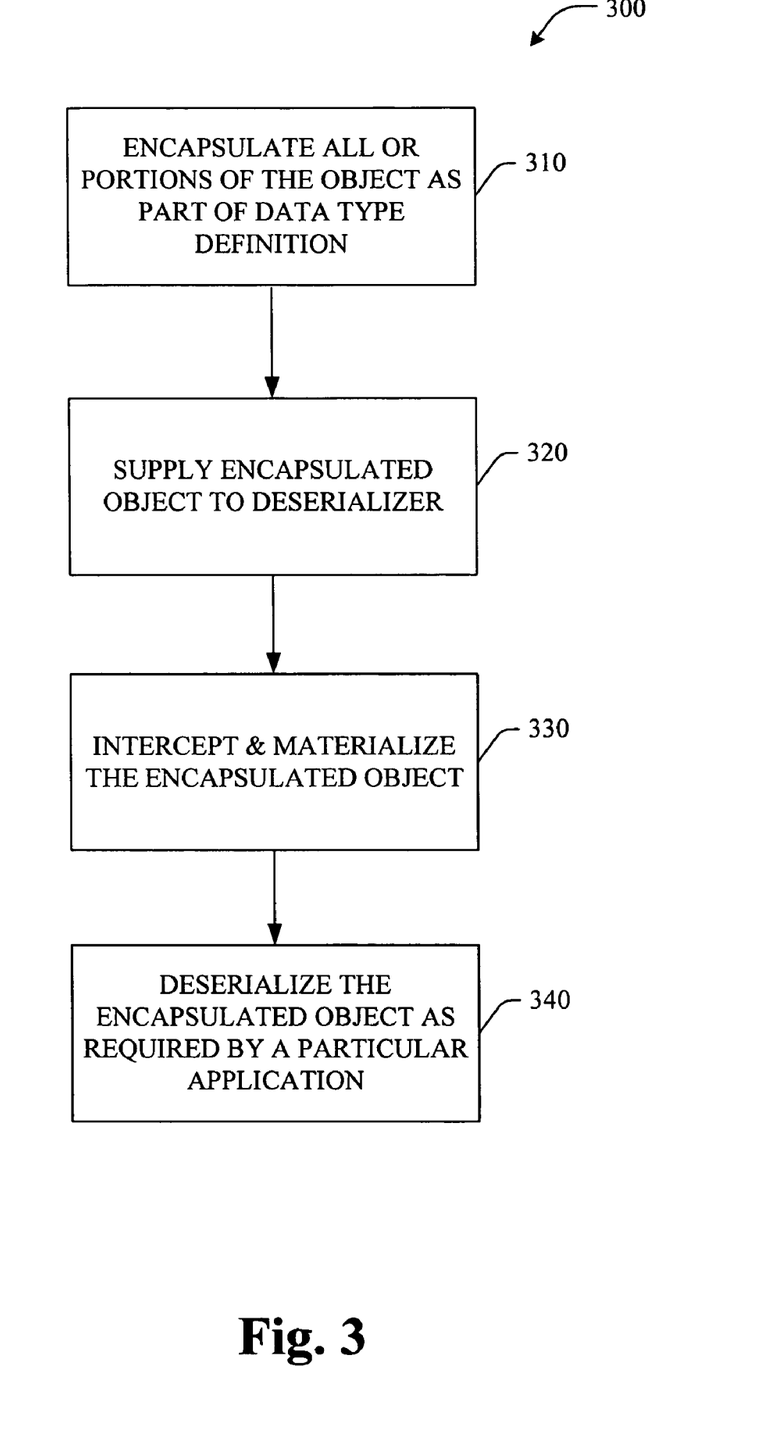
FIG. 3 illustrates a flow chart of partial deserialization according to a particular aspect of the subject invention.

FIG. 3 illustrates a particular method 300 of partial deserialization in accordance with the subject invention. Initially, and at 310, an encapsulation can be provided for a subset of indexes or all parts of the object. For such encapsulation, the author of the object can declaratively indicate a persistent field (e.g., a data member backed by property store), rather than defining fields in the object. Next, and at 320 such encapsulated object can be supplied to the deserializer. Subsequently, and at 330, the deserializer can intercept and materialize on demand the encapsulated object, to perform partial de-serialization thereof at 340. Such deserialization can in general be performed on portions of the object, as required by a particular operation, instead of deserializing the entire object. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 4:
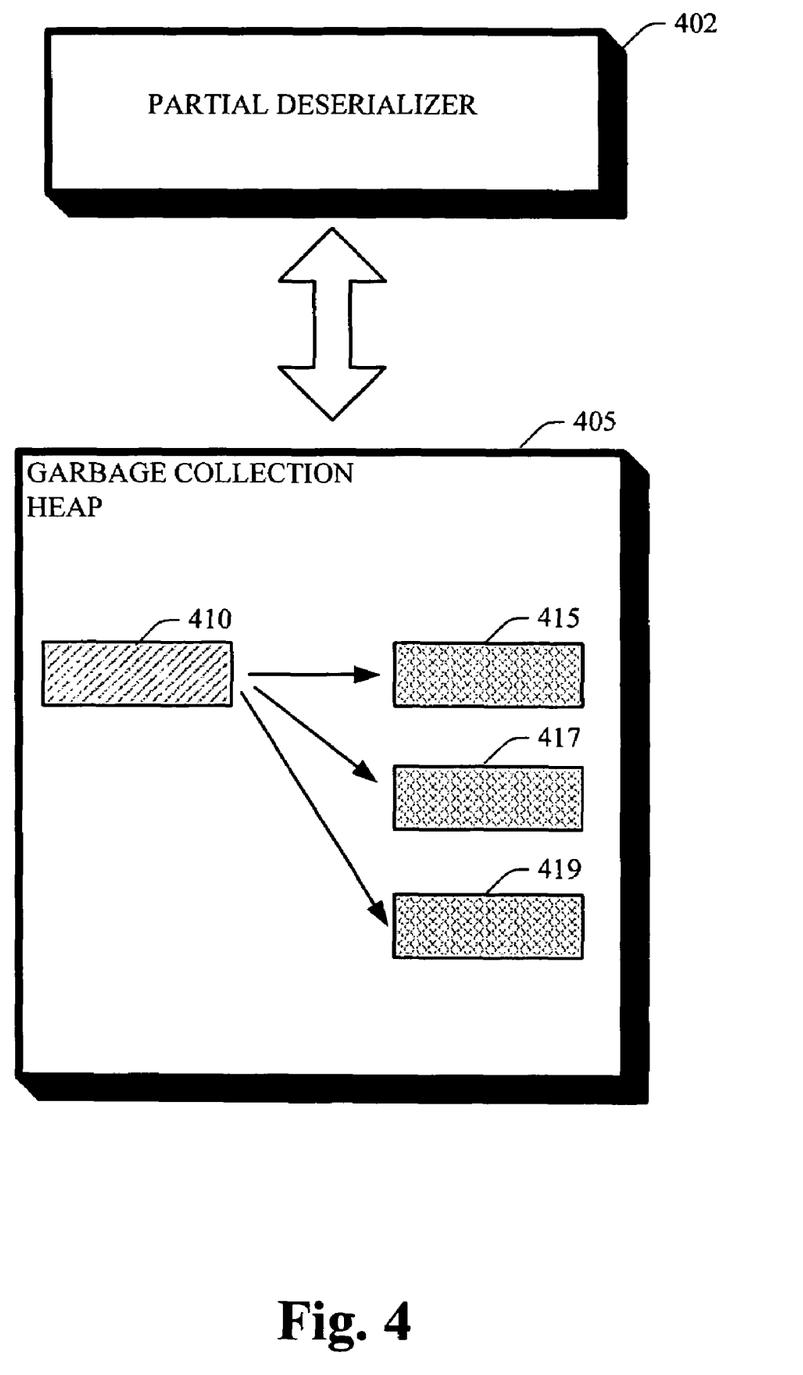
FIG. 4 illustrates a block diagram of a Garbage Collection Heap (GC Heap) that interacts with a deserializer according to an exemplary aspect of the subject invention.

Referring now to FIG. 4, the encapsulated object can be allocated from a Garbage Collection Heap (GC Heap) 405 that can facilitate memory management. Typically for a GC Heap operation, pointer(s) to memory managed by the garbage collector need to be enumerated, including pointer(s) that are in machine register(s) as well as pointer(s) stored on the execution stack. In general, the GC Heap 405 has the responsibility for periodically traversing data structure(s) in program(s) to find memory that is still being accessed (directly and/or indirectly) and reclaiming memory that is no longer being used, for example via garbage collection pointer enumeration. Accordingly, during garbage collection, the GC heap 405 can alter garbage collection pointer(s) some of which can be stored in machine register(s).

Moreover, such GC Heap 405 can supply materialization of the object for the deserializer 402. Instead of allocating the object from a memory disk, in the GC Heap 405 a live running instance for the UDT 410 of "person" can be created, for example, with pointers that point to other valid object(s) 415, 417, 419 in the GC Heap 405 associated with such UDT 410. As such, each piece (e.g., 415, 417, 419) can function as an alternate piece of primary (e.g., an object type for the object). This facilitates a quick de-referencing and allocation of the objects during the deserialization process.

Figure 5:
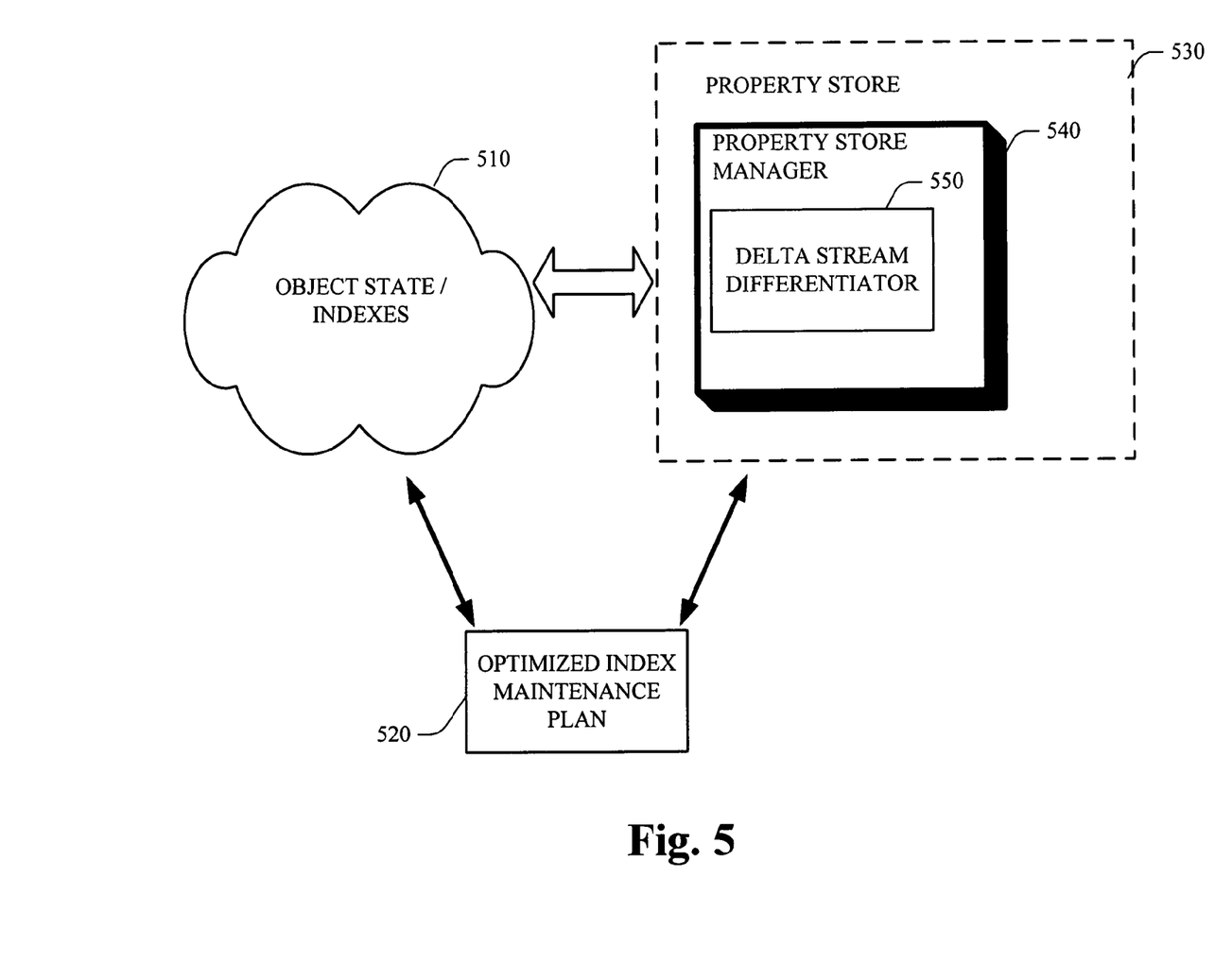
FIG. 5 illustrates a block diagram of a delta stream differentiator as part of a property manger in accordance with an aspect of the subject invention.

FIG. 5 illustrates a further aspect of the subject invention, wherein a delta stream differentiator 550 can optimize database procedures, such as by mitigating a requirement of updating all indexes associated with the object 510 during an update and/or read operation, and can further facilitate employing an associated log record as a difference (delta log) to track modifications of the various pieces of the object. The delta stream differentiator 550 can be part of the property store manager 540 that supports procedures for the property store 530. As such, the property store 530 is managed by the property store manager 540, which acts between an object and its state, for example. Once delta stream of changes related to various pieces of the object have been created, an optimized index maintenance plan 520 can be employed to change only the required indexes and not modify the remaining indexes. The property store 530 can be implemented for at least one of a top level object, a reference implementation (wherein an outer property store can be employed for navigation), and a client side backed by memory. Such implementations can be chained together to enable navigation among various paths and track the update, to determine if a copy of the object should be made, for example.

The delta stream differentiator 550 can further facilitate tracking a change modification entry for the encapsulated object associated with the object state 510. For example, during an update operation the dirty object, as well as the pre-image and post-image for the encapsulated object can be saved, whereby the changes for the dirty object can be applied in one stage. Such can be performed eagerly or lazily, wherein the string can be converted to an on-disk representation, or wait for the action update to be flushed back to disk. Moreover, a requirement to hold on to the managed objects can be mitigated, and typically property stores can be maintained. By employing unmanaged storage for the store, space can be deterministically allocated and reclaimed, via a least-recently used (LRU) or a most recently used (MRU) priority technique.

Figure 6:
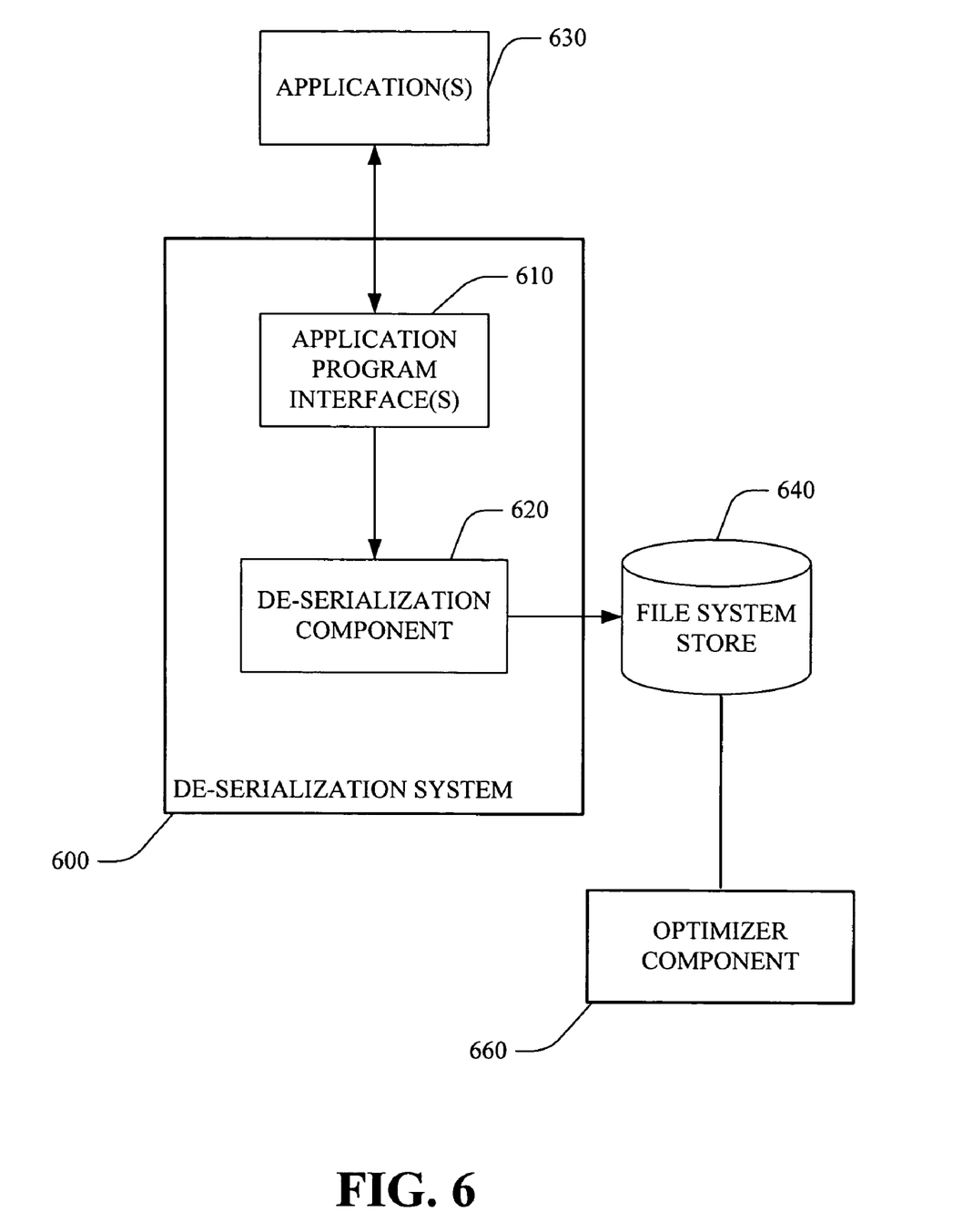
FIG. 6 illustrates a block diagram of a deserialization system in accordance with an aspect of the subject invention.

Turning next to FIG. 6, a de-serialization system 600 in accordance with an aspect of the subject invention is illustrated. The system 600 can be employed to partially deserialize an encapsulated object that is fully materialized (e.g., can be allocated from a GC Heap-not shown). Such encapsulated object can be intercepted and partially de serialized as requested by the deserialization component 620.

The system 600 can expose application program interface(s) (API's) 610 that facilitate the de-serialization of the item and its associated entity(ies). The APIs 610 can provide the encapsulated object item to the deserialization component 620, for example, received from application(s) 630. In addition, the APIs 610 can further facilitate communication between the system 600 and application(s) 630. The APIs 610 can be exposed at the file system level and/or at the store procedure level. The encapsulated object can be indicated by an author of the object as a persistent field, rather than defining fields in the object, and be partially deserialized. As such, the deserialization component 620 in general deserializes only pieces of the object that is so required by a particular operation, instead of deserializing the entire object. The deserialized objects can then be forwarded to a file system/item store 640, which can interact with an optimizer component 660, as part of an associated database layer, to determine a caching strategy for tables associated therewith.

Figure 7:
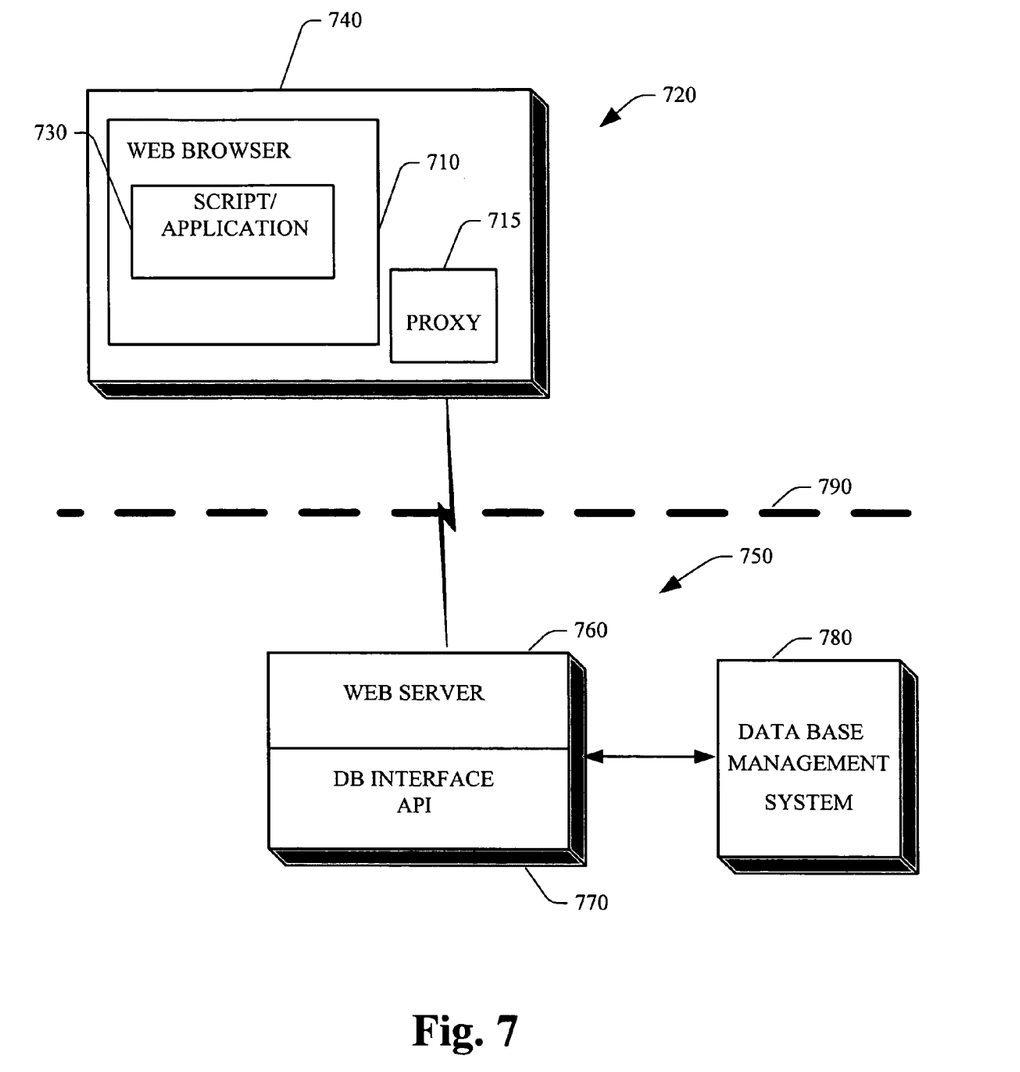
FIG. 7 illustrates a block diagram of a client server network that can employ particular deserialization aspects of the subject invention.

FIG. 7 illustrates a client server arrangement that can employ a deserialization of encapsulated objects according to an aspect of the invention, wherein running on the client 720 is a client process, for example, a web browser 710. Likewise, running on the server 750 is a corresponding server process, for example, a web server 760. In addition, embedded in the Web Browser 710 can be a script or application 730, and running within the run-time environment 740 of the client computer 720, can exist a proxy 715 for packaging and unpacking data packets formatted in accordance with various aspects of the invention. Communicating with the server 750 is a database management system (DBMS) 780, which manages access to a database (not shown). The DBMS 780 and the database (not shown) can be located in the server itself, or can be located remotely on a remote database server (not shown). Running on the Web server 760 is a database interface Applications Programming Interface (API) 770, which provides access to the DBMS 780. The client computer 720 and the server computer 750 can communicate with each other through a network 790. When the client process, e.g., the Web browser 710, requests data from a database, the script or application 730 issues a query, which is sent across the network (e.g. internet) 790 to the server computer 750, where it is interpreted by the server process, e.g., the Web server 760. The client's 720 request to server 750 can contain multiple commands, and a response from server 750 can return a plurality of result sets. Responses to client commands that are returned can be self-describing, and record oriented; (e.g. the data streams can describe names, types and optional descriptions of rows being returned.)

Figure 8:
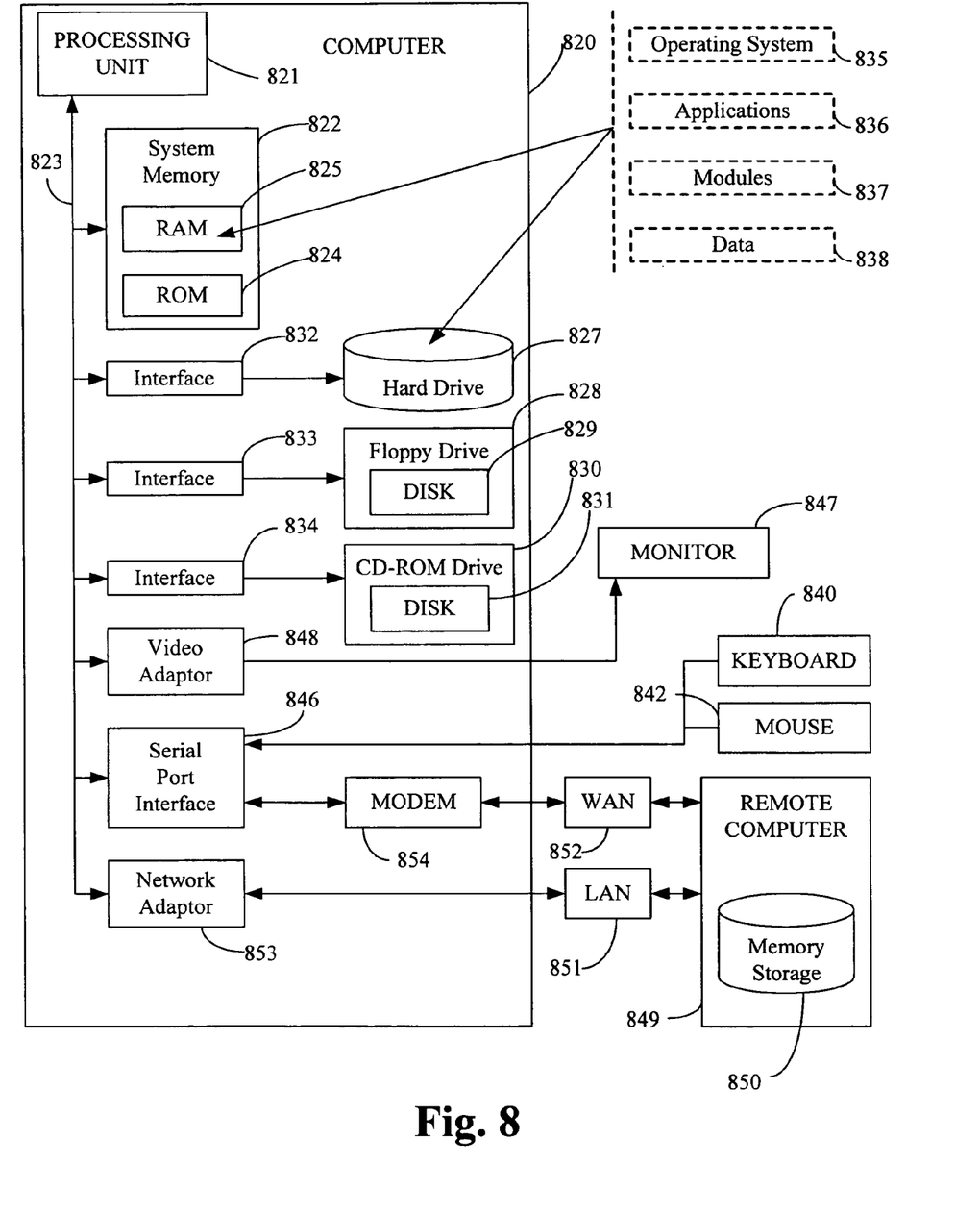
FIG. 8 illustrates a brief general description of a suitable computing environment wherein the various aspects of the subject invention can be implemented.

Referring now to FIG. 8, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 820, including a processing unit 821, a system memory 822, and a system bus 823 that couples various system components including the system memory to the processing unit 821. The processing unit 821 can be any of various commercially available processors. Dual microprocessors and other multi-processor architectures also can be used as the processing unit 821.

The system bus can be any of several types of bus structure including a USB, 1394, a peripheral bus, and a local bus using any of a variety of commercially available bus architectures. The system memory may include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 825, including an operating system 835, one or more application programs 836, other program modules 837, and program data 838. The operating system 835 in the illustrated computer can be substantially any commercially available operating system.

A user can enter commands and information into the computer 820 through a keyboard 840 and a pointing device, such as a mouse 842. Other input devices (not shown) can include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 can operate in a networked environment using logical connections to one or more remote computers, such as a remote computer 849. The remote computer 849 may be a workstation, a server computer, a router, a peer device or other common network node, and typically includes many or all of the elements described relative to the computer 820, although only a memory storage device 850 is illustrated in FIG. 8. The logical connections depicted in FIG. 8 may include a local area network (LAN) 851 and a wide area network (WAN) 852. Such networking environments are commonplace in offices, enterprise-wide computer networks, Intranets and the Internet.

When employed in a LAN networking environment, the computer 820 can be connected to the local network 851 through a network interface or adapter 853. When utilized in a WAN networking environment, the computer 820 generally can include a modem 854, and/or is connected to a communications server on the LAN, and/or has other means for establishing communications over the wide area network 852, such as the Internet. The modem 854, which can be internal or external, can be connected to the system bus 823 via the serial port interface 846. In a networked environment, program modules depicted relative to the computer 820, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 828, and CD-ROM 831) to thereby reconfigure or otherwise alter the computer system's operation, as well as other processing of signals. The memory locations wherein such data bits are maintained are physical locations that have particular electrical, magnetic, or optical properties corresponding to the data bits.

Figure 9:
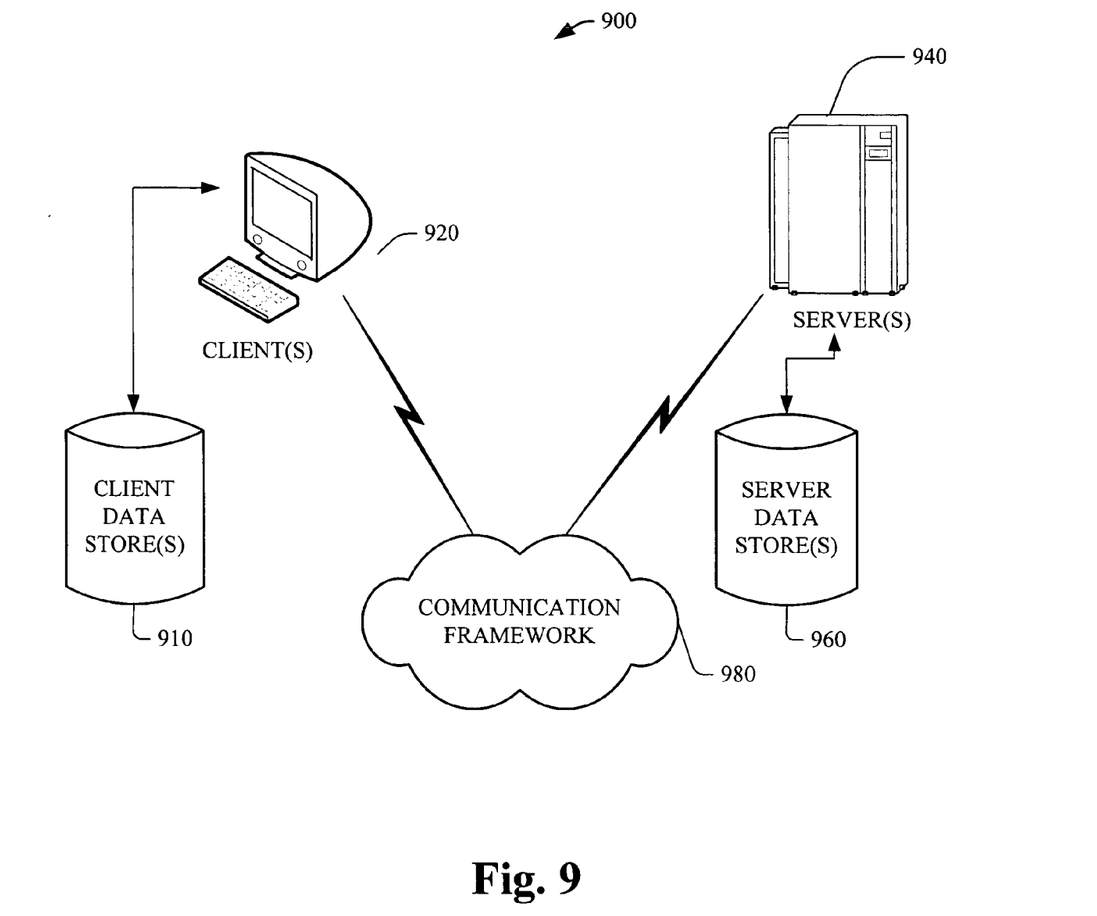
FIG. 9 illustrates a schematic diagram of a client-server system that can employ a partial deserialization according to one aspect of the invention.

Referring now to FIG. 9, a client-server system 900 that can employ a partial deserialization according to one aspect of the invention is illustrated. The client(s) 920 can be hardware and/or software (e.g., threads, processes, computing devices). The system 900 also includes one or more server(s) 940. The server(s) 940 can also be hardware and/or software (e.g., threads, processes, computing devices). For example, such servers 940 can house threads to perform transformations by employing the subject invention. The client 920 and the server 940 can communicate, between two or more computer processes. As illustrated, the system 900 includes a communication framework 980 that can facilitate communications between the client(s) 920 and the server(s) 940. The client(s) 920 is operationally connected to one or more client data store(s) 910 that can store information local to the client(s) 920. Moreover, client 920 can access and update databases 960 located on a server computer 940 running a server process. In one aspect of the invention, the communication frame work 980 can be the internet, with the client process being a Web browser and the server process being a Web server. As such, a typical client 920 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 940 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A system for facilitating object handling, the system comprising:
   one or more processors;
   a memory having computer-executable components that when executed on the one or more processors facilitates object handling;
   a serialized object represented by a Complex Type comprising a set of object properties, a first subset of the object properties is selected by an author of the serialized object to be persisted in a Property Store that is allocated in the memory from a Garbage Collection Heap, wherein the Garbage Collection Heap facilitates memory management, wherein the first subset is smaller than a total set of properties that comprises the serialized object, wherein allocating and reclaiming space are via a least-recently used (LRU) or a most recently used (MRU) priority technique;
   a deserializer that intercepts and materializes the serialized object on demand and deserializes a second subset of the object properties to form an instance of the Complex Type, the second subset of the object properties comprises one or more properties from the first subset of the object properties;
   an encapsulation component that selectively designates properties of the serialized object to have a state maintained by the Property Store based on properties that are likely to be accessed by a program or user, encapsulate a set of properties of the serialized object and store the encapsulated set of properties in the Property Store;
   a delta stream differentiator component that mitigates an update requirement on a subset of indexes associated with the serialized object during at least one of an update or a read operation, the delta stream differentiator component facilitates tracking a change modification entry for the serialized object associated with the state; and a component that forwards deserialized objects to item store which interacts with an optimizer component as part of a database layer to determine a caching strategy for tables associated with the database layer.

2. The system of claim 1, the deserializer operates as part of a relational data store.

3. The system of claim 1, the serialized object declaratively indicated as a persistent field.

4. The system of claim 1, the encapsulation component having an artificial intelligence component that facilitates selective encapsulation of the serialized object.

5. A method of facilitating object handling, the method comprising:

representing a serialized object by a Complex Type, the serialized object comprising a set of object properties, a first subset of the object properties is selected by an author of the serialized object to be persisted in a Property Store, wherein the first subset is smaller than a total set of properties that comprises the serialized object;

allocating, using a computer including a processor, the Property Store in a memory from a garbage collection heap that facilitates memory management, wherein the allocating and reclaiming space are via a least-recently used (LRU) or a most recently used (MRU) priority technique;

designating properties of the serialized object to have a state maintained by the Property Store based on properties that are likely to be accessed by a program or user;

encapsulating the set of the object properties of the serialized object;

storing the encapsulated set of the object properties in the Property Store;

tracking, by using a delta stream differentiator component, a change modification entry for the serialized object associated with the state;

intercepting and materializing the serialized object on demand;

deserializing a second subset of the encapsulated set of the object properties to form an instance of the Complex Type that is implemented by the Property Store, the second subset of the encapsulated set of the object properties comprises one or more properties from the first subset of the object properties;

mitigating an update requirement on a subset of indexes associated with the serialized object during at least one of an update or a read operation; and forwarding deserialized objects to item store which interacts with an optimizer component as a part of a database layer to determine a caching strategy for tables associated with the database layer.

6. The method of claim 5 further comprising creating a delta differentiation stream to track modifications for indexes of the object.

7. The method of claim 5 further comprising intercepting the object on demand to perform partial de-serialization thereof.

8. The method of claim 5 further comprising employing an artificial intelligence component to facilitate the deserializing.

9. A system for facilitating object handling, the system comprising:

one or more processors;

a memory having computer-executable components that when executed on the one or more processors facilitates object handling;

means for representing a serialized object by a Complex Type, the serialized object comprising a set of object properties, a first subset of the object properties is selected by an author of the serialized object to be persisted in a Property Store, wherein the first subset is smaller than a total set of properties that comprises the serialized object;

means for allocating the Property Store in the memory from a garbage collection heap that facilitates memory management, wherein the allocating and reclaiming space are via a least-recently used (LRU) or a most recently used (MRU) priority technique;

means for designating properties of the serialized object to have a state maintained by the Property Store based on properties that are likely to be accessed by a program or user;

means for encapsulating the set of the object properties of the serialized object;

means for storing the encapsulated set of the object properties in the Property Store;

means for tracking, by using a delta stream differentiator component, a change modification entry for the serialized object associated with the state;

means for intercepting and materializing the serialized object on demand;

means for deserializing a second subset of the encapsulated set of the object properties to form an instance of the Complex Type that is implemented by the Property Store, the second subset of the encapsulated set of the object properties comprises one or more properties from the first subset of the object properties;

means for mitigating an update requirement on a subset of indexes associated with the serialized object during at least one of an update or a read operation; and means for forwarding deserialized objects to item store which interacts with an optimizer component as a part of a database layer to determine a caching strategy for tables associated with the database layer.

* * * * *